(12) United States Patent
Cha et al.

(10) Patent No.: US 9,266,475 B2
(45) Date of Patent: Feb. 23, 2016

(54) RUNNING BOARD ASSEMBLY FOR VEHICLE

(71) Applicant: Hyundai Motor Company, Seoul (KR)

(72) Inventors: Dong Eun Cha, Suwon-si (KR); Seung Mok Lee, Osan-si (KR); Hyun Gyung Kim, Hwaseong-si (KR); Phil Jung Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/477,731

(22) Filed: Sep. 4, 2014

(65) Prior Publication Data

US 2015/0175078 A1 Jun. 25, 2015

(30) Foreign Application Priority Data

Dec. 20, 2013 (KR) ........................ 10-2013-0160761

(51) Int. Cl.
*B60R 3/00* (2006.01)
(52) U.S. Cl.
CPC ........................................ *B60R 3/002* (2013.01)
(58) Field of Classification Search
CPC ............. B60R 3/00; B60R 3/02; B60R 3/002
USPC ................................................. 280/166, 163
See application file for complete search history.

(56) References Cited

U.S. PATENT DOCUMENTS

| | | | | |
|---|---|---|---|---|
| 1,004,475 A * | 9/1911 | Schrader | | 182/88 |
| 6,955,370 B2 * | 10/2005 | Fabiano | | B60R 3/02 280/163 |
| 7,445,221 B2 * | 11/2008 | Kobayashi | | B60R 3/02 280/163 |
| 7,740,261 B2 * | 6/2010 | Leitner | | B60R 3/02 280/163 |
| 7,934,737 B2 * | 5/2011 | Okada | | B60R 3/02 280/163 |
| 8,342,551 B2 * | 1/2013 | Watson | | B60R 3/02 280/163 |
| 2002/0088292 A1 * | 7/2002 | Berger | | F16D 28/00 74/422 |
| 2004/0108678 A1 * | 6/2004 | Berkebile et al. | | 280/166 |
| 2005/0104318 A1 * | 5/2005 | Lee et al. | | 280/166 |
| 2005/0258616 A1 * | 11/2005 | Scheuring et al. | | 280/166 |
| 2006/0214386 A1 * | 9/2006 | Watson | | 280/163 |
| 2008/0042395 A1 * | 2/2008 | Watson | | 280/166 |
| 2010/0264618 A1 * | 10/2010 | Agoncillo et al. | | 280/166 |
| 2010/0320715 A1 * | 12/2010 | Watson | | 280/166 |
| 2012/0030886 A1 * | 2/2012 | Persson et al. | | 14/71.1 |
| 2012/0104719 A1 * | 5/2012 | Hayes | | 280/163 |
| 2014/0125031 A1 * | 5/2014 | Oh et al. | | 280/166 |
| 2014/0183835 A1 * | 7/2014 | Cha et al. | | 280/166 |
| 2014/0333042 A1 * | 11/2014 | Cha et al. | | 280/166 |

FOREIGN PATENT DOCUMENTS

| | | |
|---|---|---|
| JP | H05-086694 U | 11/1993 |
| JP | 2008-291538 A | 12/2008 |
| KR | 1997-0036985 A | 7/1997 |

(Continued)

*Primary Examiner* — Brodie Follman
*Assistant Examiner* — Brian Cassidy
(74) *Attorney, Agent, or Firm* — Morgan, Lewis & Bockius LLP

(57) ABSTRACT

A running board assembly may include a motor which supplies power, a transmission which transmits the motor's power, a rack gear which is disposed lengthily in a transverse direction of a vehicle body such that one side thereof is connected to a body of a running board, and a motion control unit which transmits the power from the transmission to the rack gear such that a motion of the rack gear is controlled to allow a sliding motion and a pivot motion of the rack gear.

9 Claims, 6 Drawing Sheets

(56) References Cited

FOREIGN PATENT DOCUMENTS

| KR | 10-2004-0046760 A | 6/2004 |
|---|---|---|
| KR | 10-2005-0031491 A | 4/2005 |
| KR | 10-0900590 B1 | 5/2009 |
| KR | 10-0900590 B1 | 6/2009 |

* cited by examiner

RUNNING BOARD ASSEMBLY FOR VEHICLE

CROSS-REFERENCE TO RELATED APPLICATION

The present application claims priority of Korean Patent Application Number 10-2013-0160761 filed Dec. 20, 2013, the entire contents of which is incorporated herein for all purposes by this reference.

BACKGROUND OF THE INVENTION

1. Field of the Invention

The present invention relates, in general, to a running board assembly for a vehicle and, more particularly, to a running board assembly for a vehicle which is designed to slide outwards and then be pivoted downwards from the side doors of a vehicle when it is used.

2. Description of Related Art

Generally, as shown in FIGS. 1A and 1B, a running board 1 aids entry into recreational vehicles (RVs) which generally have higher ground clearances compared to a sedan. However, since a conventional running board 1 is simply fixed to a vehicle body 2 (i.e. a side seal outer panel) so that it cannot be extended in a transverse direction of a vehicle, there is a drawback in that it is inconvenient for a passenger to step on the running board. Since the running board is generally not extendable outwards from a vehicle body so that it is not distinctly visible to a passenger, when a passenger gets off a vehicle, it is difficult for the passenger to correctly step on the running board, and possibly get hurt from a fall, and when a passenger gets on a vehicle, it is difficult for the passenger to step on the running board for easy entry into the vehicle.

The conventional running board thus has a fixed structure to a vehicle body in which it is not extensible in the transverse direction of a vehicle so that it is inconvenient for a passenger to get on and off the vehicle.

Further, a fixed-type conventional running board 1 shown in FIGS. 1A and 1B has a high ground clearance, so that passengers such as the elderly, the disabled and children experience inconvenience in getting on and off a vehicle using the running board.

The information disclosed in this Background of the Invention section is intended-only for enhancement of the understanding of the general background of the invention and should not be taken as an acknowledgement or any form of suggestion that this information fully describes the prior art that is known to a person skilled in the art.

BRIEF SUMMARY

Various aspects of the present invention are directed to providing a running board assembly for a vehicle which when not being utilized, is stored adjacent to an undersurface of a side seal. When the running board assembly is in use, it may be slidably extended outwards and pivoted downwards from under the side doors of a vehicle, thereby improving convenience of passengers, particularly the elderly, the disabled and children when getting on and off a vehicle, thereby improving merchantability of a vehicle.

In an aspect of the present invention, a running board assembly for a vehicle, may include a motor which supplies power, a transmission engaged with the motor to transmit a power of the motor, a rack gear which is disposed lengthily in a transverse direction of a vehicle body with a side of the rack gear connected to a body of a running board, wherein the rack gear is engaged with the transmission, and a motion control unit which selectively transmits power from the transmission to the rack gear to control a motion of the rack gear to allow a sliding motion and a pivot motion of the rack gear.

The transmission may include a drive shaft which is driven by the power of the motor, a drive gear which is integrally coupled to the drive shaft, a driven gear which is meshed with the drive gear, and a transmission rod which is integrally meshed with the driven gear while passing through the driven gear, the transmission rod being longitudinally disposed parallel to the body of the running board.

The transmission further may include a pair of support brackets which are respectively disposed opposite the driven gear, the pair of support brackets being fixedly connected to the vehicle body and through which the transmission rod rotatably passes, the support brackets serving to support the transmission rod passing therethrough.

A motor bracket is disposed at a lengthwise-middle portion of the body of the running board in such a manner as to be coupled to the vehicle body, wherein the motor is fixedly mounted to the motor bracket.

The rack gear is provided with two rack gears which each are disposed on opposite sides of the transmission rod.

The motion control unit may include a rack gear bracket which is disposed on opposite sides of the transmission rod while the transmission rod passes therethrough and is rotatable therein, a pinion gear which is disposed in the rack gear bracket in a state of being integrally coupled with the transmission rod having passed through the rack gear bracket, the pinion gear being meshed with the rack gear, a solenoid bracket which is disposed on one side of the rack gear bracket while being fixedly coupled to the vehicle body, a first solenoid unit which is coupled to the rack gear bracket and may have a first solenoid pin to come into contact with the rack gear in order to determine an amount of a sliding motion of the rack gear, and a second solenoid unit which is coupled to the solenoid bracket and may have a second solenoid pin to come into contact with the rack gear as a pivot point for a pivot motion of the rack gear.

The second solenoid pin comes into contact with the rack gear while passing through both the solenoid bracket and the rack gear bracket.

The rack gear is provided on a lateral side thereof with first and second slots into which the first and second solenoid pins are respectively inserted.

The pinion gear is disposed between the first and second solenoid pins.

The structure of the running board assembly may be such that the running board is slidably extandable outwards and pivotal downwards from under the side doors of a vehicle, thereby providing convenience to passengers, particularly the elderly, the disabled and children, and therefore improving passenger's safety when the passenger gets on and off the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatus of the present invention have other features and advantages which will be apparent from or are set forth in more detail in the accompanying drawings, which are incorporated herein and the following Detailed Description which together serve to explain certain principles of the present invention.

BRIEF DESCRIPTION OF THE DRAWINGS

FIG. 6 is a left-side perspective view of FIG. 5 according to an exemplary embodiment of the present invention.

Figure 1A:
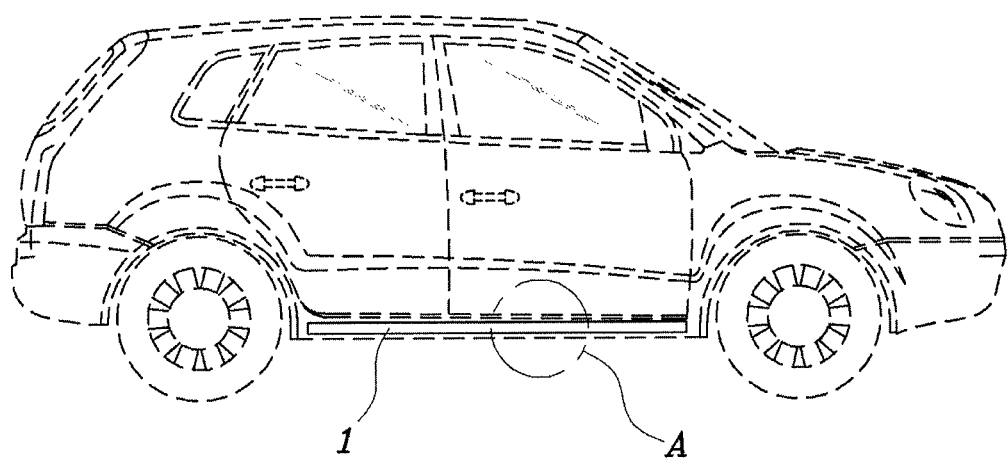
FIG. 1A is a view illustrating a conventional running board assembly for a vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments which may be included within the spirit and scope of the invention as defined by the appended claims. Hereinafter, an exemplary embodiment of the present invention will be described with reference to the accompanying drawings so that those skilled in the Field of the Invention to which the present invention pertains may carry out the exemplary embodiment.

Figure 1B:
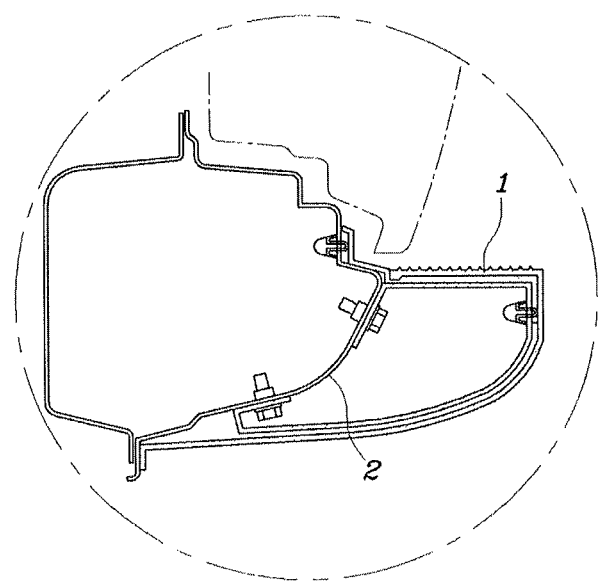
FIG. 1B is a partially enlarged view of a section A of FIG. 1A of the conventional running board assembly for the vehicle.

FIG. 1A is a view illustrating a conventional running board assembly. FIG. 1A shows the running board 11 when not in use and stored in a floor body of the vehicle. FIG. 1B is a partially enlarged view of a section A of FIG. 1A of the conventional running board assembly for the vehicle.

Figure 2A:
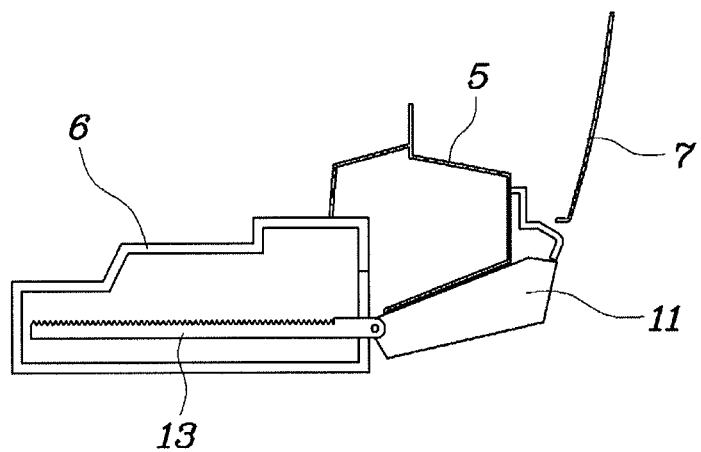
FIGS. 2A to 2C are views illustrating the operation of a running board assembly for a vehicle according to an exemplary embodiment of the present invention.
Figure 2B:
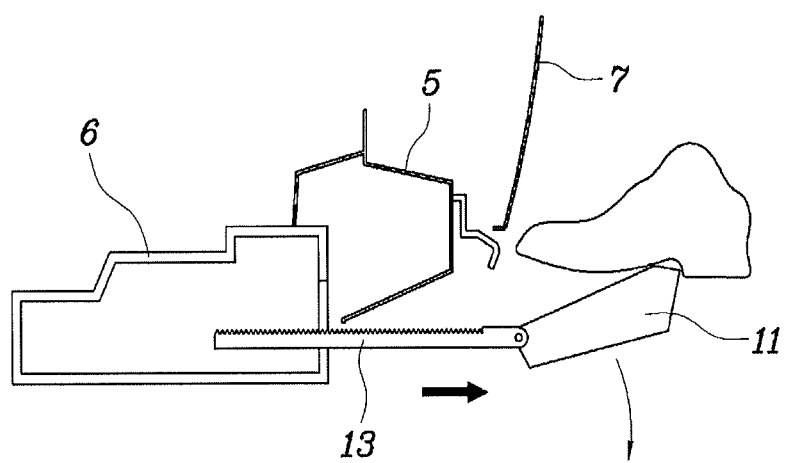
Figure 2C:
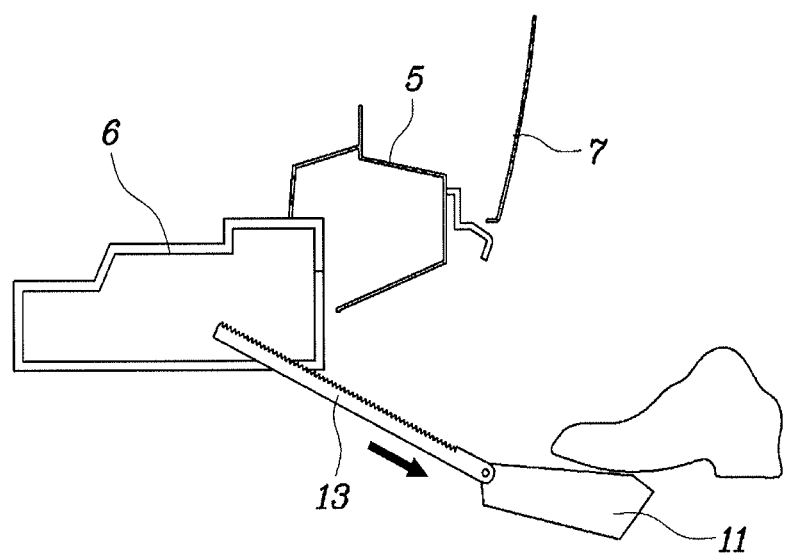
Figure 3:
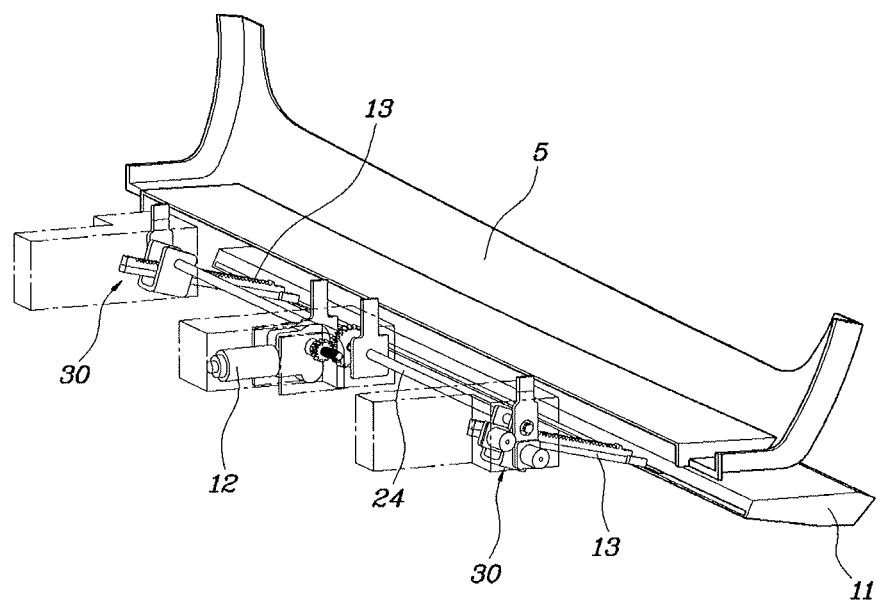
FIG. 3 is a perspective view illustrating the running board assembly of FIG. 2 according to an exemplary embodiment of the present invention.

FIGS. 2A to 2C are views illustrating the operation of a running board assembly for a vehicle according to an exemplary embodiment of the present invention. In some aspects of the present invention, the running board assembly for a vehicle may have the configuration in which, as shown in FIG. 2A, when not in use, a running board 11 is stored close to an undersurface of a side seal 5 with a rack gear 13 stored in a state of being received in a floor body 6. As shown in FIG. 2B, in use, the running board 11 and the rack gear 13 are slidably extended outwards from under a side door 7 of a vehicle and then pivoted downwards from under the side door as shown in FIG. 2C.

The outwardly-extended running board 11 shown in FIG. 2B is used in a case where a user steps and stands on the running board 11 for performing an arbitrary action on the outside of a vehicle, and the downwardly-pivoted running board 11 shown in FIG. 2C is used in a case where a passenger gets on and off the vehicle.

As shown in FIGS. 3 to 7C, the running board assembly for a vehicle includes a motor 12 which supplies power, a transmission 20 which transmits the motor's power, a rack gear 13 which is disposed lengthily in a widthwise direction of a vehicle body such that one side thereof is connected to a body of the running board 11, and a motion control unit 30 which transmits the power from the transmission 20 to the rack gear 13 such that a motion of the rack gear 13 is controlled so as to enable a sliding motion and a pivot motion of the rack gear 13.

Figure 4:
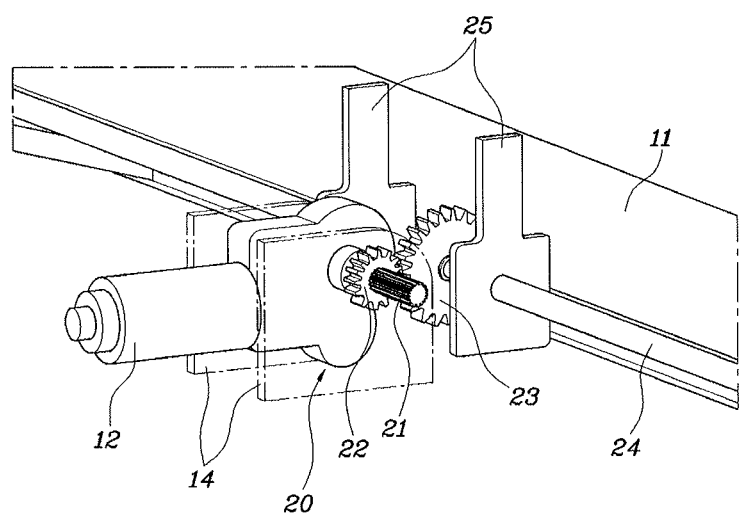
FIG. 4 is a view illustrating a transmission of the running board assembly according to an exemplary embodiment of the present invention.

As shown in FIG. 4, the transmission 20 may include a drive shaft 21 which is driven by the motor 12's power, a drive gear 22 which is integrally coupled with the drive shaft 21, a driven gear 23 which is meshed with the drive gear 22, and a transmission rod 24 which is integrally meshed with the driven gear 23 while passing through the driven gear 23 such that the transmission rod 24 may be longitudinally disposed, parallel with the body of running board 11. The transmission 20 further includes a pair of support brackets 25 which may be respectively disposed opposite the driven gear 23 in such a manner as to be fixedly coupled to the vehicle body and through which the transmission rod 24 may rotatably pass. The support brackets 25 serve to support the transmission rod 24 passing therethrough.

In an aspect of the present invention, a motor bracket 14 may be disposed at a lengthwise-middle portion of the body of the running board 11 in such a manner as to be coupled to the vehicle body, wherein the motor 12 is fixedly mounted to the motor bracket 14. FIG. 4 illustrates only a single motor 12 mounted at the middle portion of the running board 11, however more than one motor 12 may be used to suit different user's needs.

Figure 5:
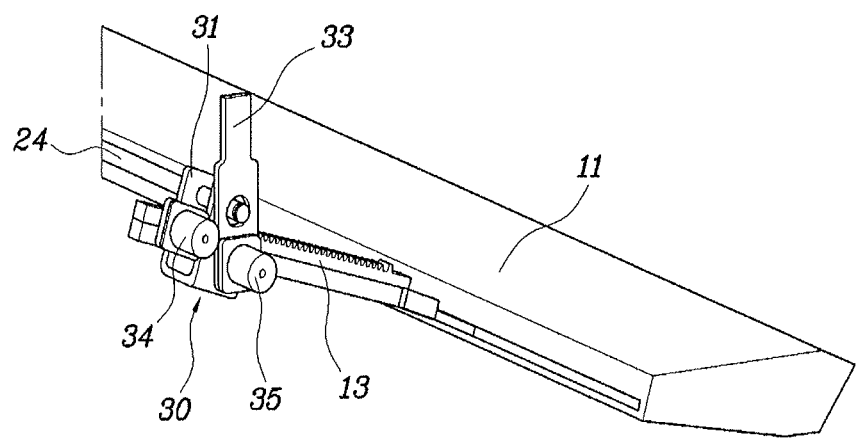
FIGS. 5 and 6 are views illustrating a motion control unit of the running board assembly, where
Figure 6:
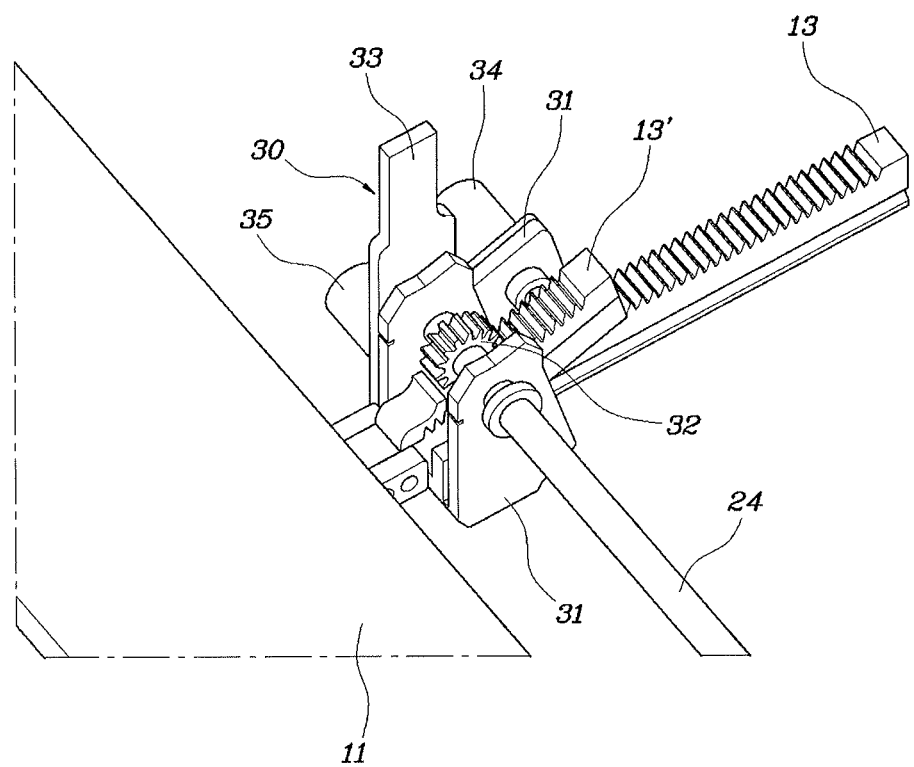

FIGS. 5 and 6 are views illustrating a motion control unit of the running board assembly, wherein FIG. 6 is a left-side perspective view of FIG. 5 according to an exemplary embodiment of the present invention. As shown in FIGS. 5 and 6, rack gear 13 may be configured with two rack gears which each are disposed on opposite sides of transmission rod 24. Thus, the configuration may be such that the two rack gears 13 coupled to the running board 11 are simultaneously operated by the single unit of motor 12, thereby minimizing the number of the motors 12 to be used, and thus advantageously reducing the size, weight, and manufacturing cost of a running board assembly.

A motion control unit 30 includes a rack gear bracket 31 which is rotatably disposed on opposite sides of the transmission rod 24 while the transmission rod 24 passes therethrough a pinion gear 32 which may be disposed in the rack gear bracket 31 in a state of being integrally coupled to transmission rod 24 having passed through-rack gear bracket 31, such that pinion gear 32 is meshed with the rack gear 13, a solenoid bracket 33 which is disposed on one side of the rack gear bracket 31 while being fixedly coupled to the vehicle body, a first solenoid unit 34 which may be coupled to rack gear bracket 31 and includes a first solenoid pin 34a configured to come into contact with rack gear 13 in order to determine an amount of a sliding motion of rack gear 13, and a second solenoid unit 35 which may be coupled to solenoid bracket 33 and include a second solenoid pin 35a configured to come into contact with rack gear 13 as a pivot point for a pivot motion of the rack gear 13.

Figure 7A:
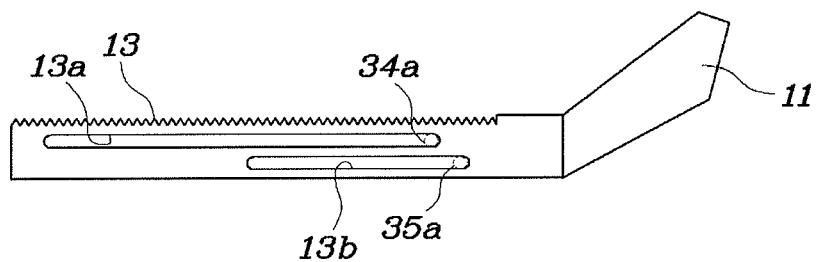
FIGS. 7A to 7C are views illustrating the operation of a rack gear using first and second solenoid pins according to an exemplary embodiment of the present invention.
Figure 7B:
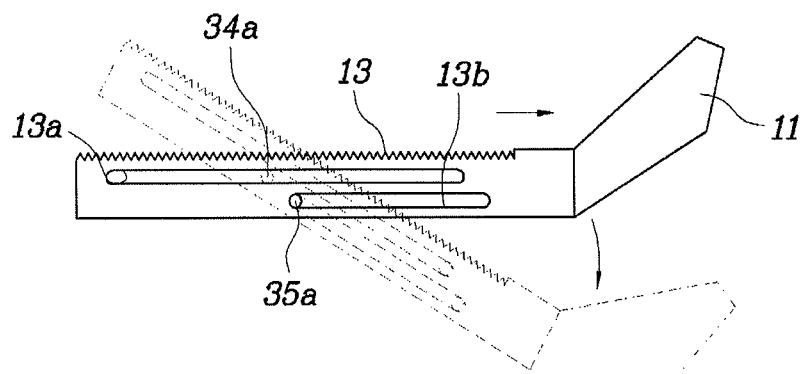

As shown in FIGS. 7A and 7B, the second solenoid pin 35a comes into contact with the rack gear 13 while passing through both solenoid bracket 33 and the rack gear bracket 31 when the second solenoid unit 35 operates. The rack gear 13 is provided on a lateral side thereof with first and second slots 13a and 13b into which the first and second solenoid pins 34a and 35a are respectively inserted.

The operation of the running board assembly according to an exemplary embodiment of the present invention will now be described.

When not in use, as shown in FIGS. 2A and 7A, the running board 11 is disposed close to an undersurface of the side seal 5, and the rack gear 13 is disposed in the floor body 6. When an operation signal (e.g. a door-open signal, a switch-control signal from a user, etc.) for the actuation of the running board assembly is generated, the first and second solenoid units 34 and 35 respectively, operate such that the first and second solenoid pins 34a and 35a are disconnected from the first and second slots 13a and 13b of rack gear 13. At the same time, the motor 12 is driven to successively rotate the drive shaft 21, the drive gear 22, the driven gear 23, the transmission rod 24, and the pinion gear 32, so that the rack gear 13 is drawn out of the floor body 6 so that the body of the running board 11 is extended outwards from under the side door 7.

As shown in FIG. 7B, in the drawing operation of the rack gear 13, when a left side of the second slot 13b is located at a position where the second solenoid unit 35 is located as shown in FIG. 7B, the second solenoid unit 35 operates the second solenoid pin 35a to protrude. The second solenoid pin 35a passes through the solenoid bracket 33 and the rack gear bracket 31 and then is inserted into the second slot 13b of the rack gear 13 (as shown with a dotted line in FIG. 7B).

When the second solenoid pin 35a protrudes, a motion of the rack gear 13 is restricted by the engagement of the second solenoid pin 35a while being continuously drawn outwards from under the side door 7 by the operation of the motor 12. Then, the rack gear 13 cannot be further drawn outwards, but starts rotating about the second solenoid pin 35a. This rotation of the rack gear 13 allows the body of the running board 11 to be pivoted downwards (as shown with a solid line in FIG. 7B).

When the rack gear 13 rotates, the second solenoid unit 35 operates the solenoid pin 35a to be disconnected from the second slot 13b, so that the rack gear 13 can be continuously drawn outwards (in an inclined direction) in a state of being pivoted downwards.

Figure 7C:
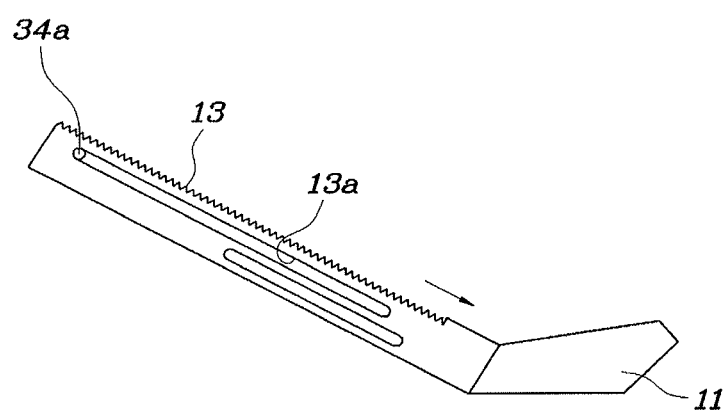

In the downward drawing operation of the rack gear 13, the first solenoid pin 34a is operated to protrude into the first slot 13a of the rack gear 13, and then, when the first solenoid pin 34a is engaged with the left side of the first slot 13a as shown in FIG. 7C, the drawing operation of the rack gear 13 is stopped, so that the drawing operation of the running board 11 is terminated. Reference numeral 13' shown in FIG. 6 indicates the rack gear which has been drawn outwards and pivoted downwards from under the side door 7.

In an embodiment of the present invention, the pinion gear 32 may be disposed between the first solenoid pin 34a and the second solenoid pin 35a such that the rack gear 13 is continuously engaged with the pinion gear 32 even though the rack gear 13 pivots as shown in FIG. 7B or moves downwards as shown in FIG. 7C. Accordingly, the running board 11 can be retreated into the floor body when the pinion gear 32 rotates backwards.

The running board assembly is drawn outwards from the side door 7, so that a passenger can easily enter and exit a vehicle while viewing the drawn running board, thereby improving passenger's safety when getting on and off the vehicle. Further, the running board 11 may be pivoted downwards while being drawn outwards so that the height of the running board to the ground can be reduced, thereby providing convenience to passengers, particularly the elderly, the disabled and children, when getting on and off a vehicle. When the running board 11 is only drawn outwards from under the side door 7 without being pivoted downwards, the drawn running board can be advantageously used in a case where a user steps and stands on the running board for performing an arbitrary action on the outside of a vehicle.

For convenience in explanation and accurate definition in the appended claims, the terms "upper", "lower" "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A running board assembly for a vehicle, comprising:
a motor which supplies power;
a transmission engaged with the motor to transmit a power of the motor;
a rack gear which is disposed in a transverse direction of a vehicle body with a side of the rack gear connected to a body of a running board, wherein the rack gear is engaged with the transmission; and
a motion control unit which selectively transmits power from the transmission to the rack gear to control a motion of the rack gear to allow a sliding motion and a pivot motion of the rack gear,
wherein the motion control unit includes a first solenoid unit selectively engaged with the rack gear and a second solenoid unit selectively engaged with the rack gear for controlling the sliding motion and the pivot motion of the running board.

2. The running board assembly for the vehicle according to claim 1, wherein the transmission includes:
a drive shaft which is driven by the power of the motor;
a drive gear which is integrally coupled to the drive shaft;
a driven gear which is meshed with the drive gear; and
a transmission rod which is integrally meshed with the driven gear while passing through the driven gear, the transmission rod being longitudinally disposed parallel to the body of the running board.

3. The running board assembly for the vehicle according to claim 2, wherein the transmission further includes:
   a pair of support brackets which are respectively disposed opposite the driven gear, the pair of support brackets being fixedly connected to the vehicle body and through which the transmission rod rotatably passes, the support brackets serving to support the transmission rod passing therethrough.

4. The running board assembly for the vehicle according to claim 1, wherein a motor bracket is disposed at a lengthwise-middle portion of the body of the running board in such a manner as to be coupled to the vehicle body, wherein the motor is fixedly mounted to the motor bracket.

5. The running board assembly for the vehicle according to claim 2, wherein the rack gear is provided with two rack gears which each is disposed on opposite sides of the transmission rod.

6. The running board assembly for the vehicle according to claim 2, wherein the motion control unit includes:
   a rack gear bracket which is disposed on opposite sides of the transmission rod while the transmission rod passes therethrough and is rotatable therein;
   a pinion gear which is disposed in the rack gear bracket in a state of being integrally coupled with the transmission rod having passed through the rack gear bracket, the pinion gear being meshed with the rack gear;
   a solenoid bracket which is disposed on one side of the rack gear bracket while being fixedly coupled to the vehicle body;
   the first solenoid unit which is coupled to the rack gear bracket and has a first solenoid pin to come into contact with the rack gear in order to determine an amount of the sliding motion of the rack gear; and
   the second solenoid unit which is coupled to the solenoid bracket and has a second solenoid pin to come into contact with the rack gear as a pivot point for the pivot motion of the rack gear.

7. The running board assembly for the vehicle according to claim 6, wherein the second solenoid pin comes into contact with the rack gear while passing through both the solenoid bracket and the rack gear bracket.

8. The running board assembly for the vehicle according to claim 7, wherein the rack gear is provided on a lateral side thereof with first and second slots into which the first and second solenoid pins are respectively inserted.

9. The running board assembly for the vehicle according to claim 6, wherein the pinion gear is disposed between the first and second solenoid pins.

* * * * *